United States Patent
Nishii et al.

(10) Patent No.: US 12,389,817 B2
(45) Date of Patent: Aug. 19, 2025

(54) AUTONOMOUS TRAVEL METHOD, WORK VEHICLE, AND AUTONOMOUS TRAVEL SYSTEM

(71) Applicant: Yanmar Holdings Co., Ltd., Osaka (JP)

(72) Inventors: Yasuto Nishii, Okayama (JP); Masaaki Murayama, Okayama (JP); Yuji Yamaguchi, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 188 days.

(21) Appl. No.: 18/220,788

(22) Filed: Jul. 11, 2023

(65) Prior Publication Data

US 2024/0040947 A1    Feb. 8, 2024

(30) Foreign Application Priority Data

Jul. 29, 2022    (JP) .................... 2022-121244

(51) Int. Cl.
*A01B 69/00*    (2006.01)
*A01B 69/04*    (2006.01)

(52) U.S. Cl.
CPC .................... *A01B 69/008* (2013.01)

(58) Field of Classification Search
CPC .................................................. A01B 69/008
See application file for complete search history.

(56) References Cited

U.S. PATENT DOCUMENTS

| | | | |
|---|---|---|---|
| 2020/0064863 A1 * | 2/2020 | Tomita | A01B 69/00 |
| 2022/0408630 A1 * | 12/2022 | Nishii | A01B 69/008 |
| 2024/0032452 A1 * | 2/2024 | Suzuki | G05D 1/0219 |

FOREIGN PATENT DOCUMENTS

| | | | | |
|---|---|---|---|---|
| EP | 3557360 A1 * | 10/2019 | | A01D 41/1278 |
| JP | 2021083332 A * | 6/2021 | | A01B 69/008 |
| KR | 2021038613 A | 4/2021 | | |
| KR | 20210038613 A * | 4/2021 | | A01B 69/008 |
| KR | 2021067923 A | 6/2021 | | |
| KR | 20210067923 A * | 6/2021 | | G05D 1/248 |
| WO | WO-2018116770 A1 * | 6/2018 | | A01B 69/00 |
| WO | WO-2021106389 A1 * | 6/2021 | | A01B 69/008 |
| WO | WO-2022118572 A1 * | 6/2022 | | G05D 1/0219 |

* cited by examiner

*Primary Examiner* — Shelley Chen
(74) *Attorney, Agent, or Firm* — Chris Mizumoto

(57) ABSTRACT

A combine harvester is a work vehicle that pre-creates a plurality of travel routes parallel to a preset outline of a field and performs autonomous travel based on the travel routes, and includes a control device and a mobile terminal. The control device functions as the autonomous travel controller to control autonomous travel on the basis of the travel route. The mobile terminal is equipped with a terminal control device, and the terminal control device functions as the route adjustment controller that performs route adjustment control to adjust the outermost route when autonomously traveling on the outermost route that is along the outline of the field from among the plurality of travel routes.

11 Claims, 7 Drawing Sheets

AUTONOMOUS TRAVEL METHOD, WORK VEHICLE, AND AUTONOMOUS TRAVEL SYSTEM

CROSS-REFERENCE

This application claims foreign priority of JP2022-121244 filed Jul. 29, 2022, the disclosure of which is hereby incorporated by reference in its entirety.

TECHNICAL FIELD

This disclosure relates to an autonomous travel method, a work vehicle, and an autonomous travel system for a work vehicle that performs autonomous travel based on a travel route parallel to an outline of a field.

BACKGROUND ART

Conventionally, a work vehicle working in a field can acquire and use an outline of a field based on position information when the work vehicle travels along an outer periphery of the field. For example, a work vehicle such as a combine harvester presets the outline of the field acquired during the previous year's reaping operation or this year's planting operation, uses it during this year's reaping operation, creates multiple travel routes parallel to the outline of the field in advance, and performs autonomous travel based on the travel routes.

For example, in Patent Document 1 discloses a controller of a combine harvester functions as a travel route creation unit that creates a travel route corresponding to a field, and as an autonomous travel control unit that controls autonomous travel and autonomous reaping along the travel route. The travel route creation unit sets a route for reaping while traveling in a liner manner, and sets a travel route by combining a plurality of linear routes for an area consisting of unreaped culms in the field.

PRIOR ART DOCUMENT

Patent Document

Patent Document 1: Japanese Laid-open Patent Publication No. 2021-185852

SUMMARY OF INVENTION

Technical Problem

Meanwhile, even if the plurality of travel routes parallel to the preset outline of the field is created in advance, there is a case where a work vehicle autonomously travels on a route different from the preset travel route. For example, when a combine harvester, which is a work vehicle, performs reaping operation in the field, it first creates a travel route parallel to the outline of the field and along the outer periphery of the field in order to perform reaping travel around along the outer periphery of the field. For example, if a travel route is set at a position recommended for headland formation, the headland can be formed along the outline of the field by performing reaping travel along the travel route. At this time, even if a travel route is created so that a travel direction is a predetermined circulating direction (e.g., counterclockwise direction), depending on a positional relationship between a position and direction of an entrance into the field or a position and direction of the work vehicle when starting reaping, and the travel route created in advance, the work vehicle may perform reaping travel in a direction opposite to the travel direction. At this time, the work vehicle may not be able to perform autonomous travel properly.

In addition, although a work vehicle creates the travel route on the basis of a center position of a machine body, a length from the center of the body of the work machine, which performs reaping operation and the like, to the left end thereof may be different from a length from the center thereof to the right end thereof. At this time, if a travel route with a travel direction is created so that a shorter end side of the work machine is located on the outer periphery side of the field (ridge side), a longer end side of the work machine deviates to the outside of the field when traveling the travel route in a direction opposite to the travel direction. On the other hand, if a travel route with a travel direction is created so that the longer end side of the work machine is located on the outer periphery side of the field (ridge side), the shorter end side of the work machine does not reach the outer periphery side of the field and leaves an unreaped area when traveling the travel route in a direction opposite to the travel direction. In this way, the work vehicle may not be able to perform autonomous travel properly.

In order to perform autonomous travel of this year, the work vehicle creates multiple travel routes based on the outline of the field which was acquired during work of the previous year. However, if the work area to be automatically traveled of this year, i.e., the outline of the field, is different from that of the previous year, the multiple travel routes created based on the outline of the previous year's field cannot provide appropriate autonomous travel suitable for the work area of this year.

An object of the present disclosure is to provide an autonomous travel method, a work vehicle, and an autonomous travel system capable of appropriately performing autonomous travel regardless of a travel route that is created in advance.

Solution to Problem

In order to solve the above mentioned problem, an autonomous travel method of the present disclosure is an autonomous travel method for a work vehicle that pre-creates a plurality of travel routes parallel to a preset outline of a field and performs autonomous travel based on the travel routes, the method including the steps of: performing autonomous travel control to control the autonomous travel based on the travel routes; and performing route adjustment control to adjust an outermost route when the autonomous travel is performed on the outermost route along the outline of the field among the plurality of travel routes.

In order to solve the above mentioned problem, a work vehicle of the present disclosure is a work vehicle for pre-creating a plurality of travel routes parallel to a preset outline of a field and performing autonomous travel based on the travel routes, including: an autonomous travel controller to control the autonomous travel based on the travel routes; and a route adjustment controller to perform route adjustment control for adjusting an outermost route when the autonomous travel is performed on the outermost route along the outline of the field among the plurality of travel routes.

In order to solve the above mentioned problem, an autonomous travel system of the present disclosure is an autonomous travel system of a work vehicle for pre-creating a plurality of travel routes parallel to a preset outline of a field and performing autonomous travel based on the travel routes, including: an autonomous travel controller to control the autonomous travel based on the travel routes; and a route adjustment controller to perform route adjustment control for adjusting an outermost route when the autonomous travel is performed on the outermost route along the outline of the field among the plurality of travel routes.

Advantageous Effects of Invention

The present disclosure provides an autonomous travel method, a work vehicle, and an autonomous travel system capable of appropriately performing autonomous travel regardless of a travel route that is created in advance.

DESCRIPTION OF EMBODIMENTS

Now, a combine harvester 1, which is an embodiment of a work vehicle according to an embodiment of the present disclosure, is described with reference to FIG. 1, etc. The combine harvester 1 travels in a field as a target to be worked by automatic driving or manual operation, and performs work such as reaping in order to perform a harvest work of crops from grain culms planted in the field. The combine harvester 1 is configured to, for example, control steering by automatic driving, as well as perform automatic work that controls a traveling speed in response to a manual operation, unmanned work that controls steering and a traveling speed by automatic driving, and can autonomously travel, turn, and work within the field.

While traveling on the route of straight rows in which a predetermined row number within the reaping possible row number is a work width (reaping width) for a plurality of rows of grain culms, the combine harvester 1 performs reaping work for the straight rows. The combine harvester 1 is set to a traveling mode of either a manual travel mode or an autonomous travel mode. When the manual travel mode is set, the combine harvester 1 is configured to perform manual travel according to steering of a steering part 9 by an operator.

On the other hand, when the autonomous travel mode is set, the combine harvester 1 is configured to perform autonomous straight travel to perform autonomous reaping while autonomously traveling along a travel route parallel to a predetermined reference.

Figure 2:
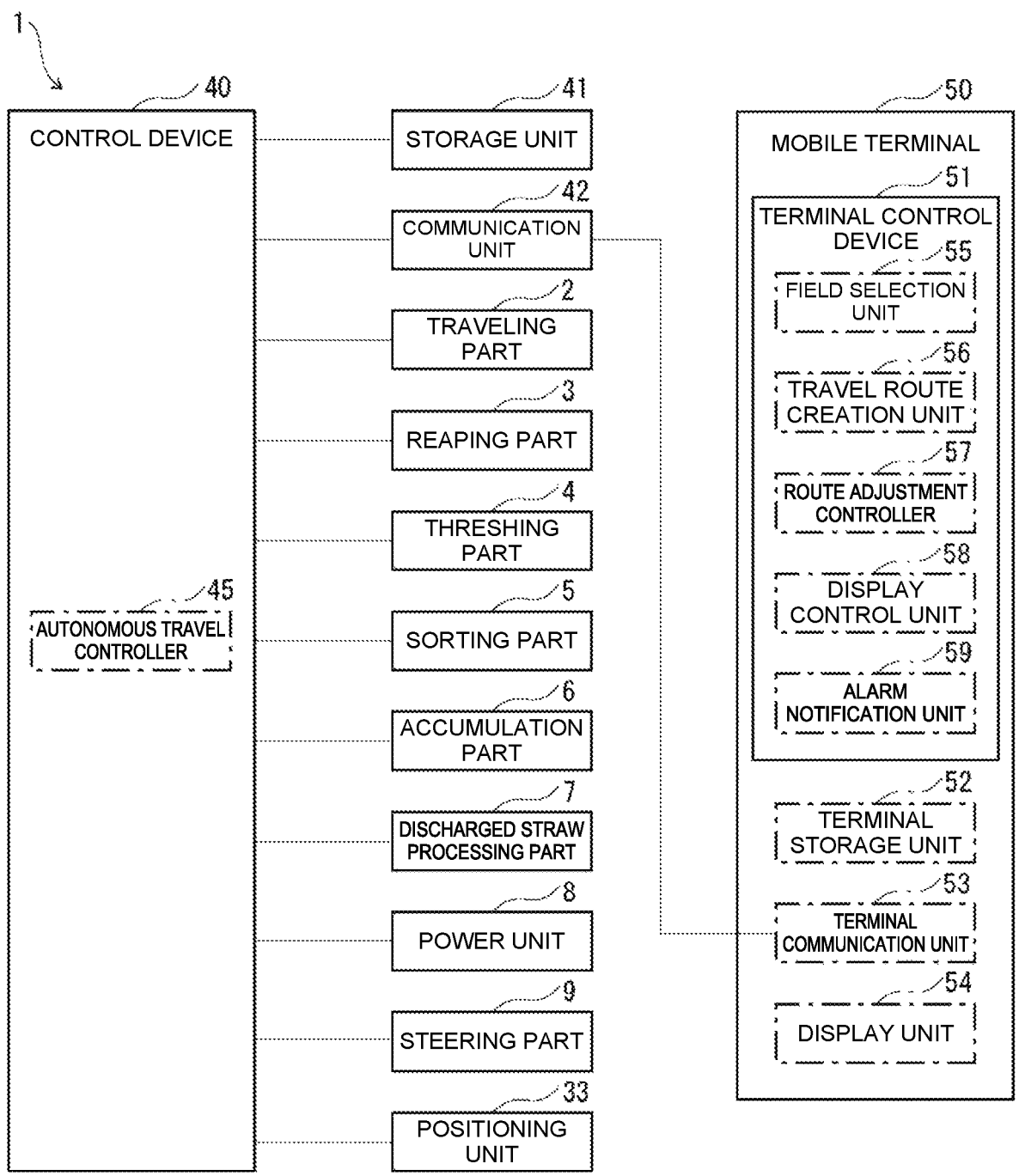
FIG. 2 is a block diagram illustrating the combine harvester according to the embodiment of the present invention.

For example, as shown in FIG. 2, the combine harvester 1 is equipped with a control device 40, and by using the outline side that configures the preset outline of the field as a reference line, the control device 40 creates a travel route parallel to the reference line in advance. The travel route indicates the position where a center of the combine harvester 1 (machine body center) in a machine-body-width direction (left-right direction) passes through the field.

When the autonomous travel mode is set, the combine harvester 1 sets either a work width reference mode or a vehicle's own position reference mode as a route mode of the travel route for autonomous travel.

When the work width reference mode is set, the combine harvester 1 creates multiple travel routes parallel to the outline of the field (any of outline sides) and at work width intervals of the combine harvester 1 from the outline of the field. In this case, the combine harvester 1 performs outer periphery reaping travel, in which the combine harvester 1 circulates along the outer periphery of the field and travels while reaping, based on a travel route parallel to the outline of the field, so that a headland area is formed in the field. Furthermore, in the work area formed inside the headland, the combine harvester 1 performs autonomous straight travel for each travel route set parallel to the outline of the field.

On the other hand, when the vehicle's own position reference mode is set, the combine harvester 1 creates a single travel route that is parallel to the outline of the field and passes through the combine 1's own vehicle position. In this case, the combine harvester 1 sets the travel route each time it starts the autonomous straight travel.

Figure 1:
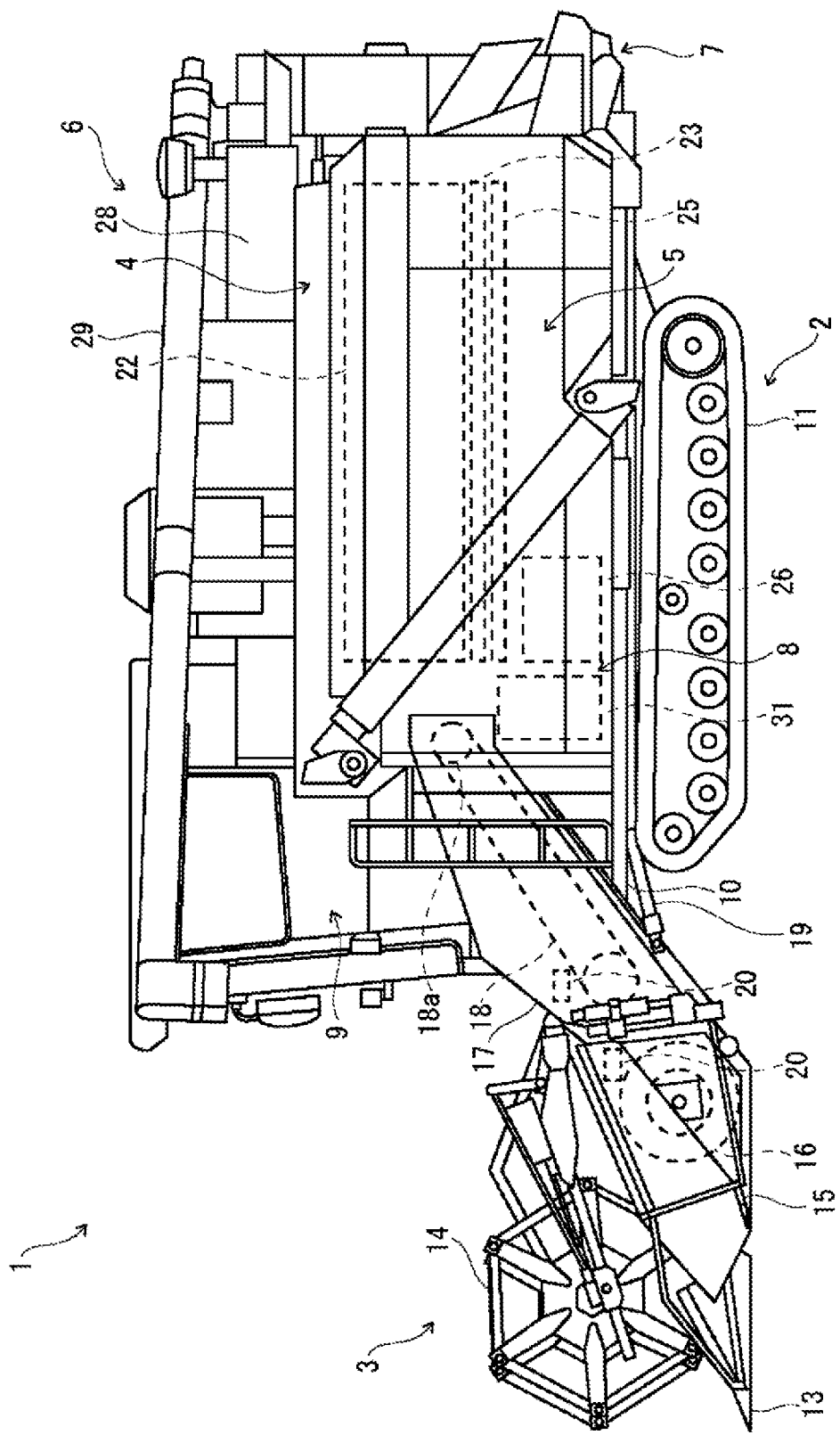
FIG. 1 is a side view illustrating a combine harvester according to an embodiment of the present disclosure.

As illustrated in FIG. 1, the combine harvester 1 includes a traveling part 2, a reaping part 3, a threshing part 4, a sorting part 5, an accumulation part 6, a discharged straw processing part 7, a power unit 8, and a steering part 9, and is configured as a so-called normal-type combine harvester. While traveling by the traveling part 2, the combine harvester 1 threshes, by the threshing part 4, grain culms reaped by the reaping part 3, sorts the grains by the sorting part 5, and stores the grains in the accumulation part 6. The combine 1 processes threshed and discharged straw with the discharged straw processing part 7. By the power supplied by the power unit 8, the combine harvester 1 drives the traveling part 2, the reaping part 3, the threshing part 4, the sorting part 5, the accumulation part 6, and the discharged straw processing part 7.

The traveling part 2 is provided below a machine body frame 10, and includes a pair of crawler-type traveling device 11 on each side and a transmission (not shown). By the power (for example, rotational power) transmitted from an engine 31 of the power unit 8, the traveling part 2 rotates a crawler of the crawler-type traveling device 11, thereby to cause the combine harvester 1 to travel in the front/rear direction, or causes the combine harvester 1 to turn to the right/left direction. The transmission transmits power (rotational power) of the power unit 8 to the crawler-type traveling device 11 and is capable of shifting the rotational power.

The reaping part 3 is installed in front of the traveling part 2 and is a work machine that reaps a predetermined reaping width (work width) of culms in the unreaped area (work area). In the present embodiment, the reaping part 3 is configured so that the width direction of the combine harvester 1 (left and right direction) is the work width direction, and the lengths from the center of the combine harvester 1 to both ends in the work width direction are different. For example, the reaping part 3 is configured so that the length from the center of the machine body to one end (e.g., right end) is shorter than the length from the center of the machine body to the other end (e.g., left end), in other words, the reaping part 3 is configured to have one end with a shorter length and the other end with a longer length. For example, the reaping part 3 is provided with a divider 13, a scraping reel 14, a mowing blade 15, a scraping auger 16, a feeder house 17, and a conveyor 18.

The divider 13 is provided protruding forward from the left front end and right front end of the reaping part 3, and guides grain culms in the unreaped area within the reaping width. The scraping reel 14 is located behind the divider 13, and is rotatable around a rotation axis extending in the left-right direction. The scraping reel 14 is rotationally driven so as to assist in reaping the grain culms guided by the divider 13, thereby to scrape the tip side of the grain culms while causing the grain culms to stand. The mowing blade 15 is positioned below the scraping reel 14, and cuts the culm end side of the grain culm scraped by the scraping reel 14 thereby reaping the grain culm.

The scraping auger 16 is located behind the scraping reel 14 and mowing blade 15, and is provided rotatable around a rotation axis extending in the left-right direction. The scraping auger 16 is rotationally driven thereby to scrape the grain culms mowed by the mowing blade 15 and convey the grain culms rearward.

The feeder house 17 extends forward from the machine body frame 10 to be positioned behind the scraping auger 16, and is supported by the machine body frame 10 rotatable around the drive shaft 18a of the conveyor 18. Furthermore, the feeder house 17 rotates, thereby to raise and lower the divider 13, the scraping reel 14, the mowing blade 15 and the scraping auger 16, which are provided in front of the feeder house 17, i.e., raising and lowering the reaping part 3. The combine harvester 1 is equipped with a lifting device 19 on the machine body frame 10 that raises and lowers the reaping part 3 by rotating the feeder house 17. The lifting device 19 includes, for example, a hydraulic cylinder powered by the engine 31.

The conveyor 18 is rotatably provided within the feeder house 17, and moves as the feeder house 17 rotates. The conveyor 18 is rotationally driven thereby to convey the grain culms, which are conveyed into the feeder house 17 by the scraping auger 16, further rearward to the threshing part 4.

The threshing part 4 is provided behind the feeder house 17 of the reaping part 3, and threshes the grain culms conveyed from the feeder house 17. The threshing part 4 is provided with a handling drum 22 and a receiving net 23. The handling drum 22 threshes grains from the grain culms conveyed from the feeder house 17, and conveys the threshed grain culms, that is, discharged straw, to the discharged straw processing part 7. The receiving net 23 supports the grain culms conveyed by the handling drum 22, and sifts and drops the grains.

The sorting part 5 is provided below the threshing part 4. The sorting part 5 includes a swing sorting device 25, an air blow sorting device 26, a grain conveying device (not shown), and a waste straw discharging device (not shown). The swing sorting device 25 sifts the threshed grain that falls from the threshing part 4 and sorts the threshed grains into grain, straw waste, etc. The air blow sorting device 26 further sorts the threshed grains that fall from the threshing part 4 or the threshed grains that are sorted by the swing sorting device 25 into grains, straw wastes, etc., by air blow. The grain conveying device conveys to the accumulation part 6 grains sorted by the swing sorting device 25 and the air blow sorting device 26. The waste straw discharging device discharges to the outside of the machine the waste straw and the like sorted by the swing sorting device 25 and the air blow sorting device 26.

The accumulation part 6 is disposed on the right side of the threshing part 4. The accumulation part 6 includes a grain tank 28 and a grain discharging device 29. The grain tank 28 reserves the grains conveyed from the sorting part 5. The grain discharging device 29 is composed of a discharging auger or the like, and discharges the grains stored in the grain tank 28 to any place.

The discharged straw processing part 7 is disposed behind the threshing part 4. The discharged straw processing part 7 includes a discharged straw conveying device (not shown) and a discharged straw cutting device (not shown). The discharged straw processing part 7, by the discharged straw conveyor, conveys the discharged straws which are conveyed from the threshing part 4 to the discharged straw cutting device, cuts the straws by the discharged straw cutting device, and discharges the cut straws to behind the combine harvester 1.

The power part 8 is disposed above the traveling part 2, and in front of the accumulation part 6. The power unit 8 includes an engine 31 that generates rotational power. The power unit 8 transmits rotational power generated by the engine 31, to the traveling part 2, the reaping part 3, the threshing part 4, the sorting part 5, the accumulation part 6, and the discharged straw processing part 7. Furthermore, the combine harvester 1 is equipped with a fuel tank (not shown) to store fuel to be supplied to the engine 31 of the power unit 8.

The steering part 9 is disposed above the power unit 8. Around a driver's seat on which the operator is seated, the steering part 9 is provided with operation tools for steering the combine harvester 1. The steering part 9 includes as the operation tools a steering wheel which is a steering wheel to instruct the machine body of the combine harvester 1 to turn, a main gearshift lever and a sub gearshift lever which are a speed changing tool to instruct the combine harvester 1 to make a speed change in forward and backward travel, and the like. Manual traveling of the combine harvester 1 is performed by the traveling part 2 that accepts operation of the steering wheel, the main gearshift lever and the sub gearshift lever of the steering part 9. Also, the steering part 9 includes a mechanism for operating reaping work by the reaping part 3, threshing work by the threshing part 4, discharging work by the grain discharging device 29 of the accumulation part 6, and the like.

The combine harvester 1 includes a positioning unit 33 that uses a satellite positioning system such as GPS to acquire the combine harvester 1's own position. The positioning unit 33 receives a positioning signal from a positioning satellite via a positioning antenna, and acquires position information of the positioning unit 33, i.e., the combine harvester 1's own position, based on the positioning signal.

Next, a control device 40 of the combine harvester 1 is described with reference to FIG. 2. The control device 40 is composed of a computer such as a CPU and is connected to a storage unit 41 such as ROM, RAM, hard disk drive, flash memory, etc. and a communication unit 42 which communicates with external devices.

The storage unit 41 stores program and data to control a variety of components and a variety of functionalities of the combine harvester 1, and the control device 40 executes arithmetic processing based on the program and data stored in the storage unit 41 to control the variety of components and the variety of functionalities. The control device 40, for example, acquires the combine harvester 1's own position by controlling the positioning unit 33 and also acquires a travel direction at the combine harvester 1's own position.

Via a wireless communication antenna, the communication unit 42 is capable of wirelessly communicating with the external devices such as a mobile terminal 50 belonging to the operator. The control device 40 controls the communication unit 42 to perform wireless communication with a mobile terminal 50, and transceives a variety of information to and from the mobile terminal 50.

Figure 3:
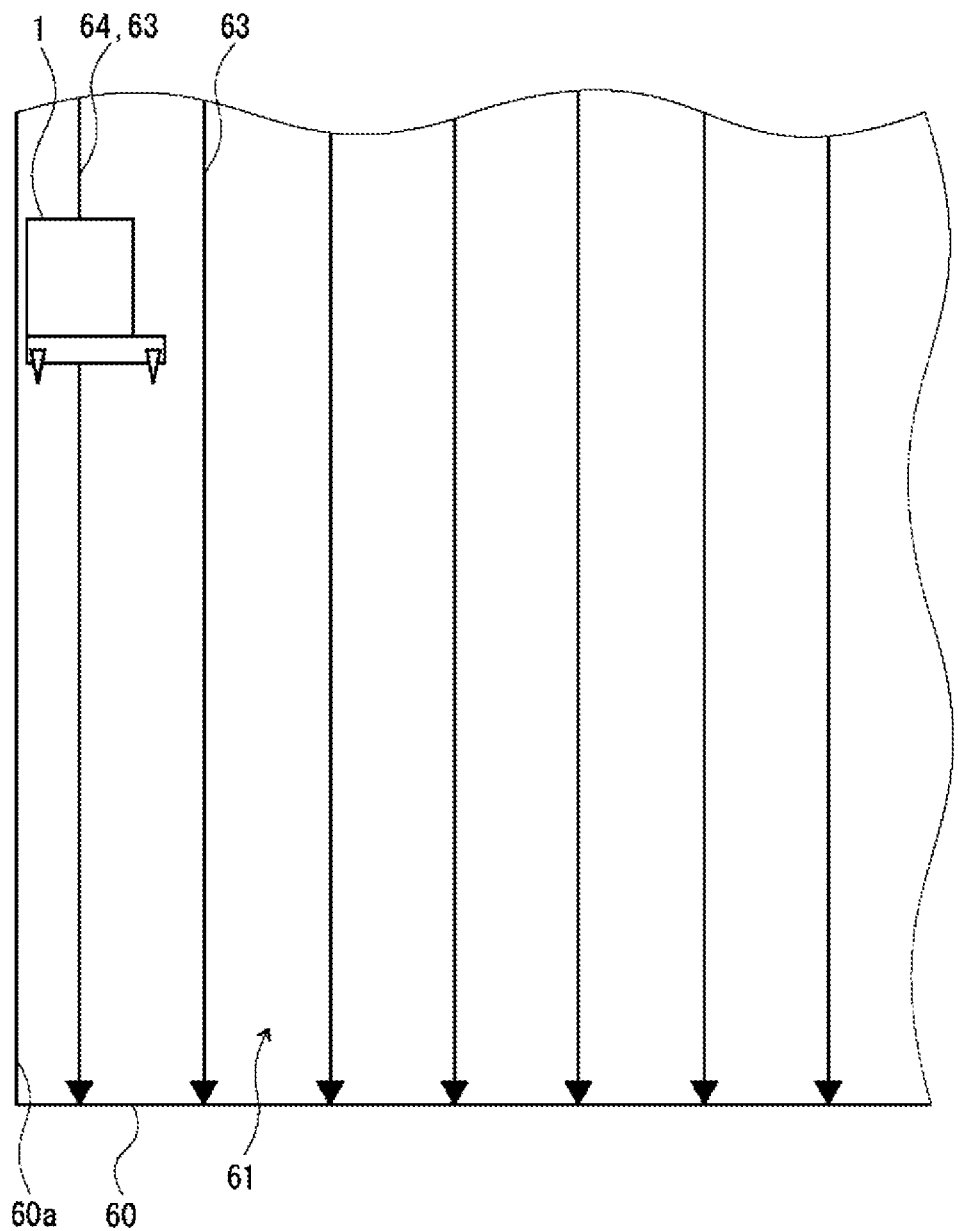
FIG. 3 is a plan view illustrating an example of a field in which a pre-created travel route is set in the combine harvester according to the embodiment of the present disclosure.
Figure 4:
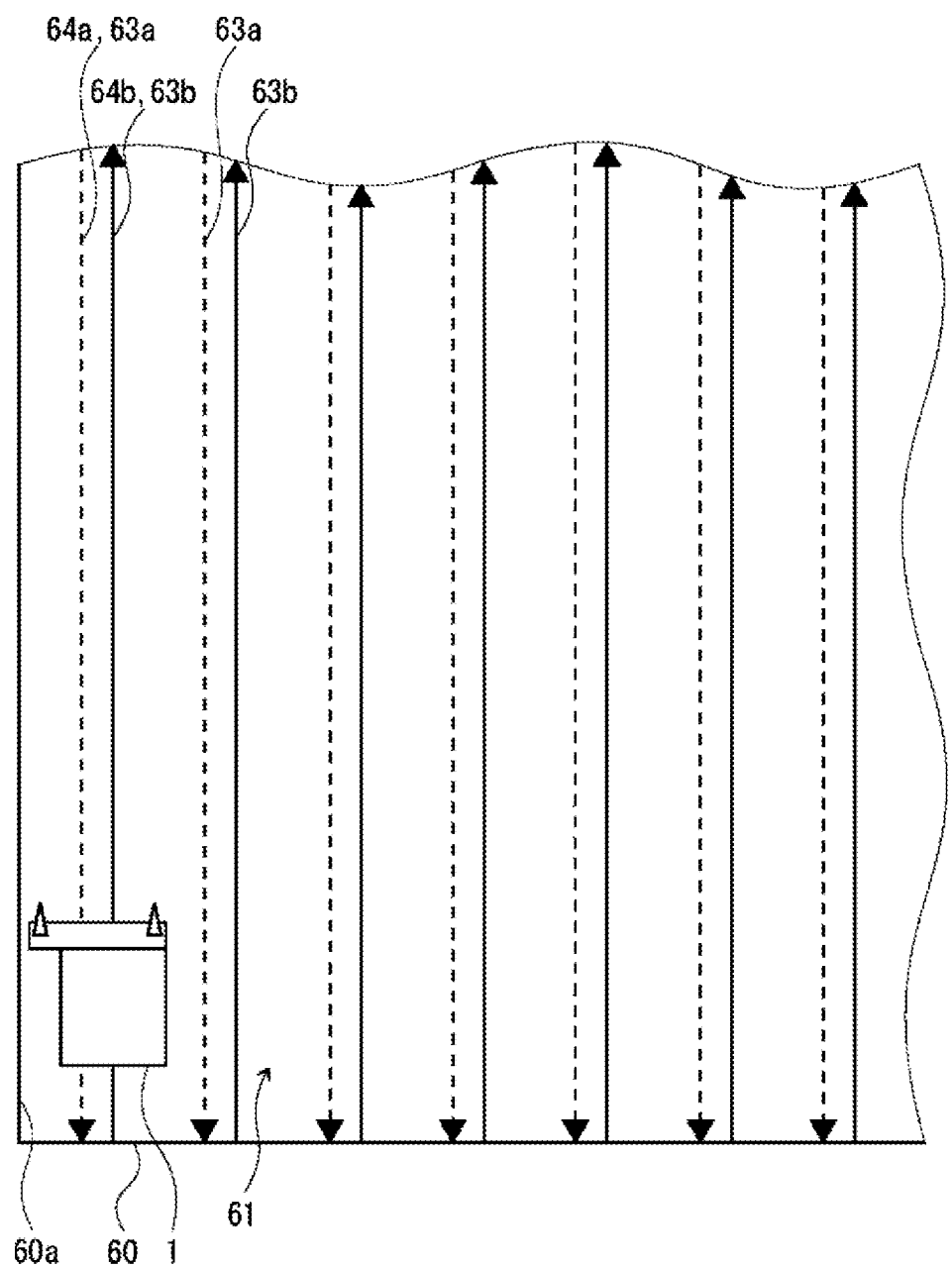
FIG. 4 is a plan view illustrating an example of a field in which a travel route with an outermost route adjusted is set in the combine harvester according to the embodiment of the present disclosure.

As shown in FIG. 3 or 4, the control device 40 receives field information and a travel route 63 that are set for the field 60, which is a target to be worked by the combine harvester 1, from the mobile terminal 50 via the communication unit 42, and stores them in the storage unit 41.

In FIGS. 3 and 4, the field 60 has an unreaped area 61 (unworked area) where the reaping is not yet performed, and a reaped area (worked area) where the reaping operation of the culms is already completed, and also the figures shows an example in which the travel route 63 is set.

The field information includes information such as shape, size, and position information (coordinates, etc.) of field area along the outer periphery of the field 60, as well as information such as shape, size, and position information (coordinates, etc.) of the unreaped area 61 in the field 60. For example, the travel route 63 includes traveling information about autonomous travel and work information about work such as reaping and the like. The traveling information includes the travel position in the field 60 as well as the travel direction and the set vehicle speed at each travel position. The work information includes information associated with the work such as operation or stop of the reaping, the reaping speed and reaping height at each travel position.

Furthermore, the control device 40 operates as an autonomous travel controller 45 by executing the program stored in the storage unit 41. The autonomous travel controller 45 realizes an autonomous travel step of the autonomous travel method according to the present disclosure.

The autonomous travel controller 45 controls, when the autonomous travel mode is set, the autonomous traveling (autonomous straight travel) of the combine harvester 1 based on the travel route 63 set for the field 60. Upon autonomous travel is initiated, the autonomous travel controller 45 acquires the combine harvester 1's own position from the positioning unit 33, and controls the power unit 8 and the traveling part 2 and the reaping part 3 such that the combine harvester 1 performs autonomous travel along the travel route 63 based on the combine harvester 1's own position, the field information, and the travel route 63.

The mobile terminal 50 is one of components of the combine harvester 1, which can remotely operate the combine harvester 1, and is composed of a tablet terminal including a touch panel, a laptop personal computer, or the like, for example. An operation device similar to the mobile terminal 50 may be provided in the steering part 9. In the present disclosure, the autonomous travel system includes the combine harvester 1 and the mobile terminal 50. The mobile terminal 50 may be configured separately from the combine harvester 1 or integrally to the combine harvester 1.

As shown in FIG. 2, the mobile terminal 50 includes a terminal control device 51 composed of a computer such as a CPU, and the terminal control device 51 is connected to a terminal storage unit 52 such as a ROM, a RAM, a hard disk drive, a flash memory or the like, a terminal communication unit 53 that communicates with an external devices. The mobile terminal 50 includes a display unit 54, such as a touch panel or a monitor, for displaying various information to output them to the operator, and the display unit 54 which is composed of the touch panel functions as an input unit for accepting input operation of various information from the operator.

The terminal storage unit 52 stores a program and data for controlling various components and various functions of the mobile terminal 50. The terminal control device 51 executes arithmetic process based on the program and the data stored in the terminal storage unit 52, thereby controlling the various components and the various functions of the mobile terminal 50. The terminal storage unit 52 stores field information and the travel route 63 of the field 60, which is a target to be worked by the combine harvester 1.

The terminal communication unit 53 is communicably connected to the communication unit 42 in the combine harvester 1 via a wireless communication antenna. The terminal control device 51 controls the terminal communication unit 53 to perform wireless communication with the combine harvester 1, and transceives various information to and from the combine harvester 1.

The terminal control device 51 operates as a field selection unit 55, a travel route creation unit 56, a route adjustment controller 57, a display control unit 58, and an alarm notification unit 59 by executing the program stored in the terminal storage unit 52. The field selection unit 55, the travel route creation unit 56, the route adjustment controller 57, the display control unit 58, and the alarm notification unit 59 realize a field selection step, a travel route creation step, a route adjustment control step, a display control step, and an alarm notification step of the autonomous travel method according to the present disclosure, respectively.

The mobile terminal 50 enables the operator to set any of the manual travel mode and the autonomous travel mode according to the operator's operation, and also enables the operator to set any of the route modes such as the work width reference mode and the vehicle's own position reference mode. For example, in the mobile terminal 50, the terminal control device 51 functions as a traveling mode setting unit to set the traveling mode and as a route mode setting unit to set the route mode according to operation on the setting screen (not shown) displayed at the display unit 54 by the display control unit 58. In other words, the terminal control device 51 realizes the travelling mode setting step for setting the traveling mode and the route mode setting step for setting the route mode of the autonomous travel method according to the present disclosure.

The field selection unit 55 manually or automatically selects the field 60 which is a target to be worked by autonomous travel. For example, the field selection unit 55 displays, on the display unit 54, a field selection screen (not shown) for selectively operating the field 60 that corresponds to the field information preset and stored in the terminal storage unit 52. Once any of the fields 60 is selected on the field selection screen in response to the manual operation, the field selection unit 55 selects the selected field 60 as the target to be worked and reads out the field information from the terminal storage unit 52. For example, the mobile terminal 50 stores the field information acquired during reaping work of the previous year by the combine harvester 1 in the terminal storage unit 52, and stores the field information acquired during works of this year by other work vehicles (e.g., planting work by a rice transplanter or tilling work by a tractor) in the terminal storage unit 52.

When creation of a new field is operated on the field selection screen, the field selection unit 55 selects, as the target to be worked, the new field in the vehicle's own position of the combine harvester 1. In this case, when the combine harvester 1 performs the reaping travel while circulating along the outer periphery of the new field, the field selection unit 55 receives from the combine harvester 1 the vehicle's own position of the combine harvester 1 that is positioned by the positioning unit 33 of the combine harvester 1, and records the position information of the outer periphery or the position information of the route of reaping travel, thereby to create the field information of the new field and store the created field information in the terminal storage unit 52.

The travel route creation unit 56 creates in advance the travel route 63 along which the combine harvester 1 autonomously travels, based on the field information of the field 60 selected by the field selection unit 55, by using the outline side 60*a* constituting the outline of the field 60 as a reference line, creates the travel route 63 parallel to the reference line, stores it in the terminal storage unit 52, and transmits it to the combine harvester 1 via the terminal communication unit 53. At this time, the travel route creation unit 56 sets, as the reference line, the outline side 60*a* that is closest to the combine harvester 1's own position and has the smallest angle to a travel direction of the combine harvester 1, among the multiple outline sides that configures the outline of the field 60.

The travel route creation unit 56, for example, sets the travel route 63 according to the set route mode when the field 60 to be worked is selected. When the work width reference mode is set as the route mode, the travel route creation unit 56 creates a plurality of travel routes 63 that are parallel to the outline side 60*a* which is the reference line of the field 60 and are arranged at intervals of the work width of the combine harvester 1 from the outline side 60*a* of the field 60.

On the other hand, when the vehicle's own position reference mode is set as the route mode, the travel route creation unit 56 creates a single travel route 63 that is parallel to the outline side 60*a* which is the reference line of the field 60 and passes through the combine harvester 1's own position.

Furthermore, when the work width reference mode is set, the travel route creation unit 56 creates the travel route 63 by setting the travel direction so that a shorter one end (e.g., right end) of the reaping part 3 follows the outline side of the field 60, as the travel route 63 (outermost route 64) closest to the outline side 60*a* that is the reference line. In this case, for example, the travel route creation unit 56 may preferably set the travel route 63 in such a position that the travel direction along a direction corresponding to the outline side 60*a*, which is the reference line, is recommended in a predetermined circulating direction (e.g., counterclockwise direction) along the outer periphery of the field 60. As another example, when creating the travel route 63, the travel route creation unit 56 may set the travel direction in advance as the travel route 63. For example, in a predetermined circulating direction, the travel direction corresponding to the outline side 60*a*, which is the reference line of the travel route 63 may be set to the travel route 63.

When the autonomous travel mode is set as the traveling mode, and if the travel route 63 is created using the preset field information and the autonomous travel is performed on the outermost route 64 along the predetermined outline side 60*a* that constitutes the outline of the field 60, the route adjustment controller 57, as shown in FIG. 4, performs route adjustment control to adjust the outermost route 64. At this time, the route adjustment controller 57 adjusts as route adjustment control the outermost route 64 so as to be parallel to the outline side 60*a* of the field 60 and pass through the combine harvester 1's own position. In FIG. 4, the outermost route 64*a* before adjustment is shown as a dashed line, and the outermost route 64*b* after adjustment is shown as a solid line.

Therefore, when the work width reference mode is set as the route mode, the route adjustment controller 57 can adjust the outermost route 64 so as to pass through the combine harvester 1's own position, without switching route modes, by performing route adjustment control. At this time, the route adjustment controller 57 adjusts as route adjustment control any travel routes 63 other than the outermost route 64 among the plurality of travel routes 63 so as to be arranged at intervals of a work width from the adjusted outermost route 64*b*. In FIG. 4, the travel route 63*a* before adjustment is shown as a dashed line, and the travel route 63*b* after adjustment is shown as a solid line.

The route adjustment controller 57 may determine whether or not the separation distance between the outermost route 64*a* and the combine harvester 1's own position exceeds a predetermined separation threshold in a direction orthogonal to the outermost route 64*a* of the travel route 63*a* created in advance, and perform route adjustment control according to the determination result. For example, the route adjustment controller 57 may perform route adjustment control if the separation distance exceeds the separation threshold, while it may not perform route adjustment control if the separation distance is equal to or less than the separation threshold.

When the work width reference mode is set, the autonomous travel controller 45 of the combine harvester 1 enables shift to autonomous travel after route adjustment control by the route adjustment controller 57 is performed, but when route adjustment control is not performed, it disables shift to autonomous travel. On the other hand, when the vehicle's own position reference mode is set, the autonomous travel controller 45 of the combine harvester 1 may enable shift to autonomous travel without performing route adjustment control by the route adjustment controller 57. Alternatively, the route adjustment controller 57 may perform route adjustment control each time when autonomous travel of the outermost route 64 is started, regardless of the route mode.

The route adjustment controller 57 performs route adjustment control before autonomous travel of the outermost route 64 is started. For example, when the work screen 70 for performing autonomous travel is displayed on the display unit 44, the route adjustment controller 57 performs route adjustment control in response to operation of the route adjustment button 77 on the work screen 70. Alternatively, when the travel start button 72 is operated without the route adjustment button 77 being operated on the work screen 70, the route adjustment controller 57 recommends performing route adjustment control to the operator before the autonomous travel is started. At this time, if operation of route adjustment control is not performed, the route adjustment controller 57 does not perform route adjustment control, and the autonomous travel controller 45 of the combine harvester 1 disables shift to autonomous travel.

The route adjustment controller 57 may not perform route adjustment control to any travel routes 63 other than the outermost route 64 among the plurality of travel routes 63 before the autonomous travel is started.

The route adjustment controller 57 may also update the preset field information based on the adjusted outermost route 64*b*. For example, the route adjustment controller 57 calculates the position information of an outermost edge of the combine harvester 1 when the combine harvester 1 is placed at each position of the adjusted outermost route 64*b* based on the positional relationship between the center of the machine body of the combine harvester 1 and the outermost edge of the combine harvester 1 (edge of the reaping part 3), and calculates a new outline side along the adjusted outermost route 64*b*. The route adjustment controller 57 then updates the field information of the field 60 selected as the work target, which is the preset field information, by the new outline side.

Figure 5:
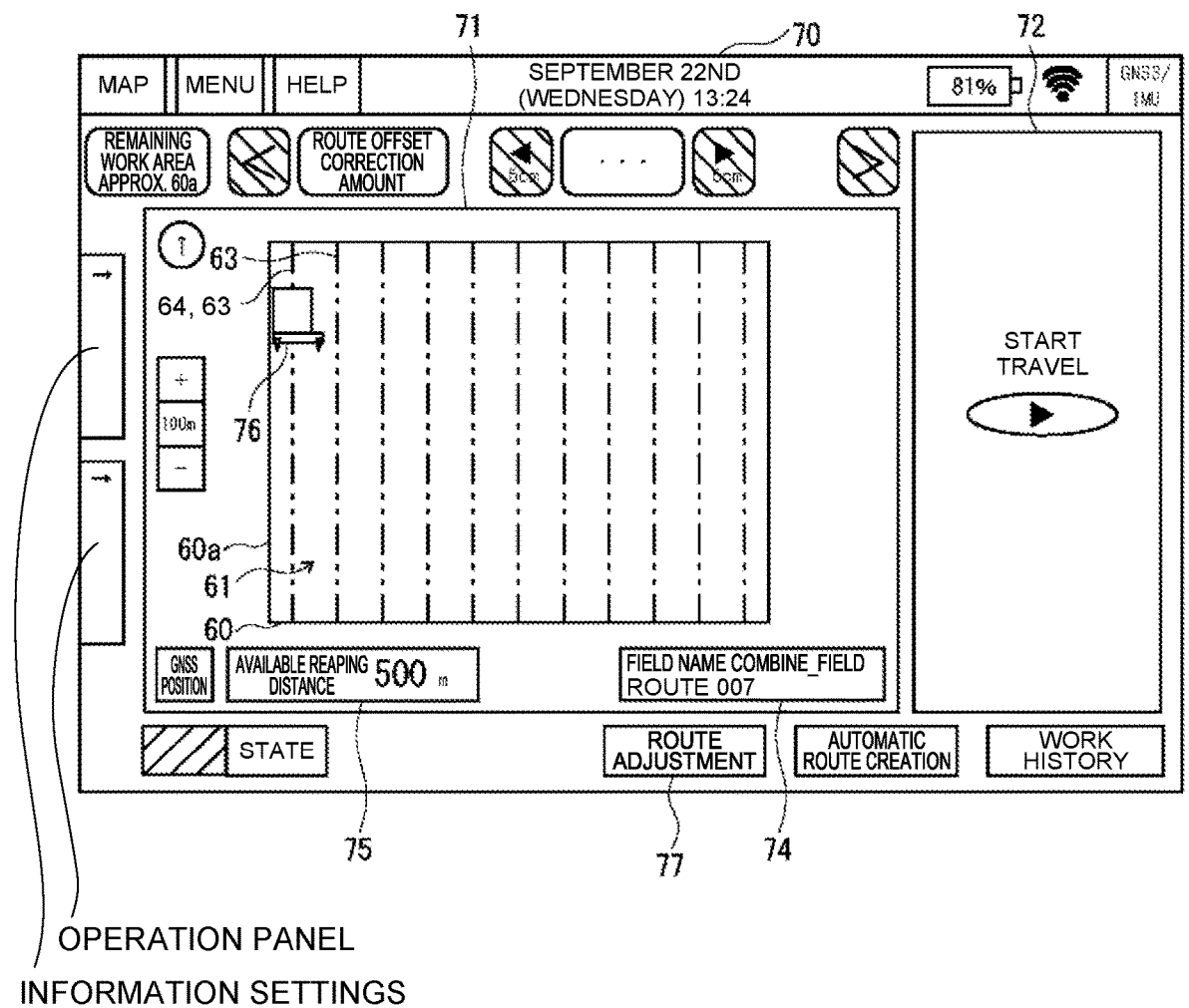
FIG. 5 is a plan view illustrating an example of a work screen displayed on a mobile terminal of the combine harvester according to the embodiment of the present disclosure.

When the autonomous travel mode is set, the display control unit 58 controls the display unit 54 to cause the work screen 70 to be displayed, which is used for performing autonomous travel in the field 60 that is a target to be worked, as illustrated in FIG. 5, based on the field information of the field 60 selected by the field selection unit 55 The display control unit 58 causes the work screen 70 to display at least a map column 71 and to display travel start button 72 operably. In addition, the display control unit 58 causes the work screen 70 to display a field registration name 74 that is based on the field information, and a reaping available distance 75 that is based on the storage capacity (vacant capacity) of the grain tank 28 in which the combine harvester 1 stores grain. The display control unit 58 also causes the work screen 70 to display a route adjustment button 77 for performing route adjustment control.

The display control unit 58 causes the map column 71 to display the outline of the field 60, the travel route 63 set for the field 60, and an own vehicle marker 76 of the combine harvester 1 at the combine harvester 1's own position positioned by the positioning unit 33. In FIG. 5, the travel route 63 is shown as a double-dashed line. When the travel route 63 is set as a travel direction, the display control unit 58 may cause the map column 71 to indicate a corresponding travel direction with an arrow or the like when to display the travel route 63. The display control unit 58 identifiably displays the unreaped area 61 and the reaped area 62 in the range of the field 60, by varying a display method such as a line type, a line color, or a background color. In addition, the display control unit 58 updates the position of the own vehicle marker 76, the range of the unreaped area 61 and the range of the reaped area, according to the progress of the reaping travel of the combine harvester 1.

When the work width reference mode is set as the route mode and the start condition for autonomous travel is met, the display control unit 58 causes the route adjustment button 77 to be selectable, while when the vehicle's own position reference mode is set as the route mode or the start condition is not met, the display control unit 58 causes the route adjustment button 77 to be unselectable. The display control unit 58 may cause the route adjustment button 77 to be selectable when the preset field information is selected (e.g., when performing reaping operation in the field 60 after two or more years), while the display control unit 58 may cause the route adjustment button 77 to be unselectable when the field information of a new field is selected (e.g., when performing reaping operation of the field 60 in the first year).

The display control unit 58 causes the travel start button 72 to be selectable when a start condition for the autonomous travel is met, while the display control unit 58 causes the travel start button 72 to be unselectable when the start condition for the autonomous travel is not met. Once the travel start button 72 is selected, the display control unit 58 transmits the field information, information about the travel route 63 as well as a start instruction of autonomous travel to the combine harvester 1. The combine harvester 1 starts autonomous travel along the travel route 63 in response to the start instruction.

Furthermore, when the travel start button 72 is selected, if the work width reference mode is set as the route mode, the preset field information is selected, and the route adjustment control of the outermost route 64 of the plurality of travel routes 63 is not yet performed, the display control unit 58 performs recommendation control that recommends performing route adjustment control before issuing the start instruction of autonomous travel. The recommendation control with the display control unit 58 may include, for example, display of a recommendation message, audio output, or display of a recommendation screen (not shown) to encourage operation of the route adjustment control using the route adjustment button 77, or to encourage operation of the route adjustment control by operation on the recommendation screen. Furthermore, when the travel start button 72 is selected, if the vehicle's own position reference mode is set as the route mode, the field information of the new field is selected, and the route adjustment control of the outermost route 64 of the plurality of travel routes 63 is already performed, the display control unit 58 may issue the start instruction of autonomous travel.

Alternatively, if the work width reference mode is set as the route mode, the preset field information is selected, and the route adjustment control of the outermost route 64 of the plurality of travel routes 63 is not yet performed, the display control unit 58 may cause the travel start button 72 to be unselectable and cause the route adjustment button 77 to be selectable.

When the route adjustment control is performed by the route adjustment controller 57, the display control unit 58 updates the travel route to the travel route 63*b* including the adjusted outermost route 64*b* and causes the work screen 70 to display it. The display control unit 58 may enable cancellation operation of the route adjustment control, and when the cancellation operation is performed, the display control unit 58 may cause the work screen 70 to display the previously pre-created travel route 63*a*.

While the combine harvester 1 performs autonomous travel, the display control unit 58 causes the work screen to display a travel stop button (not depicted) to stop autonomous travel instead of the travel start button 72 so as to be selectable and display the route adjustment button 77 so as to be unselectable. Once the travel stop button is selected, the display control unit 58 issues a stop instruction to the combine harvester 1. In response to the stop instruction, the combine harvester 1 stops autonomous travel. Once the combine harvester 1 stops autonomous travel, the display control unit 58 causes the work screen to display the travel start button 72 instead of a travel stop button and display the route adjustment button 77 so as to be selectable.

The alarm notification unit 59 provides an alarm by display or audio output when it detects a situation where the combine harvester 1 cannot continue to perform autonomous travel safely. For example, when the combine harvester 1 autonomously travels along the travel route 63 that is created by using the outline side 60*a* of the field 60 as the reference line, the alarm notification unit 59 determines, based on the combine harvester 1's own position and travel direction of the combine harvester 1 and the field information, whether or not the distance from the combine harvester 1 to each outline side 60*a* of the field 60 in the advancing direction of the combine harvester 1 is equal to or less than a predetermined distance threshold. The alarm notification unit 59 does not issue an alarm if the distance to the outline side 60*a* exceeds the distance threshold, but issues an alarm if the distance to the outline side 60*a* is equal to or less than the distance threshold. The distance threshold is set based on a braking distance that the combine harvester 1 can safely stop, etc.

However, when the combine harvester 1 autonomously travels on the outermost route 64, in regard to the outline side 60*a* that is parallel to and closest to the outermost route 64 (that is, the outline side 60*a* that is the reference line for the outermost route 64 before route adjustment control is performed), the alarm notification unit 59 does not determine whether or not the distance to the outline side 60*a* is equal to or less than the distance threshold, and does not issue the alarm even if the distance is equal to or less than the distance threshold. On the other hand, even when the combine harvester 1 autonomously travels on the outermost route 64, in regard to the outline side other than the outline side 60*a* that is the reference line of the outermost route 64, the alarm notification unit 59 determine whether or not the distance is equal to or less than the distance threshold, and issues the alarm if the distance is equal to or less than the distance threshold.

Figure 6:
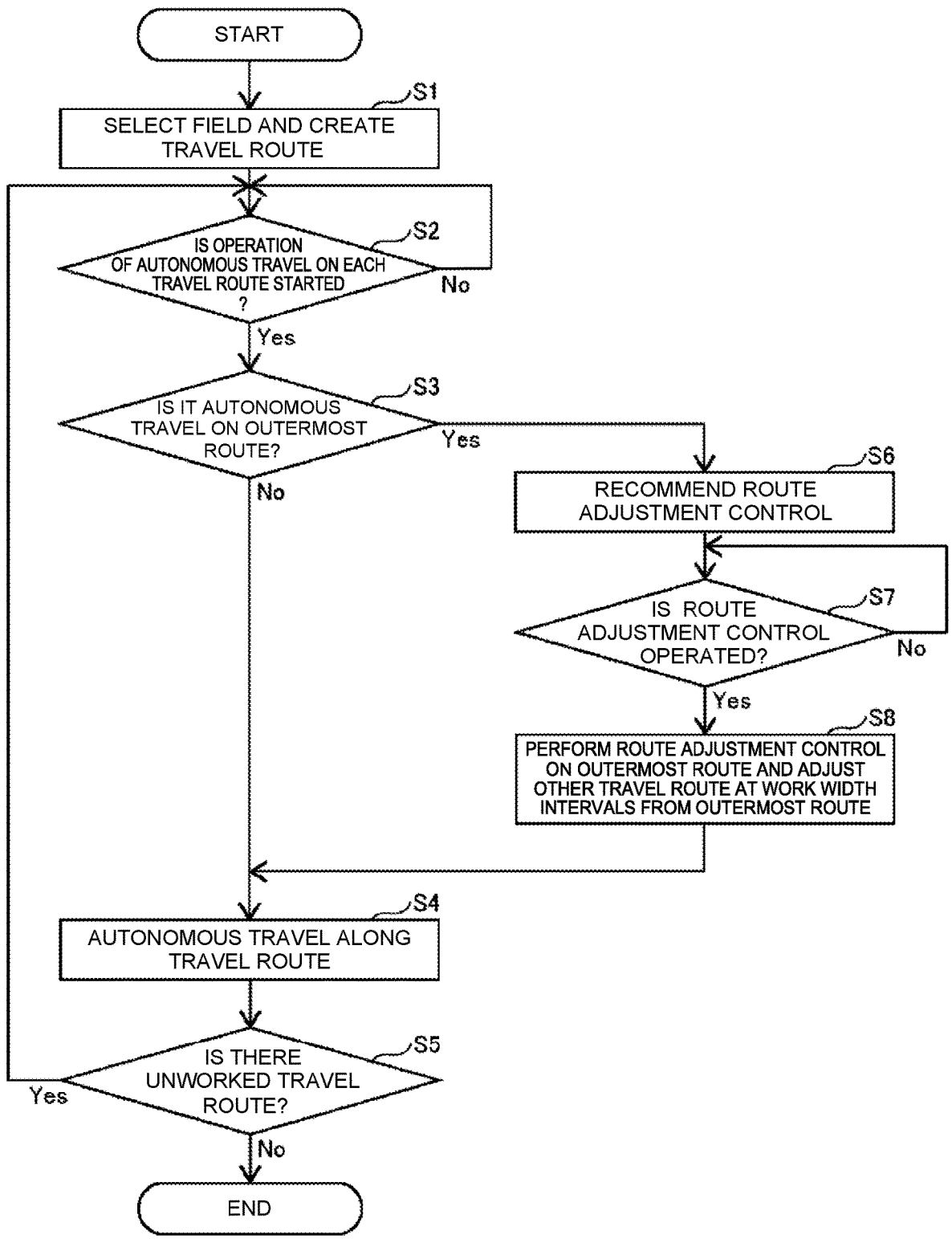
FIG. 6 is a flowchart illustrating exemplarily autonomous travel operation of the combine harvester according to the embodiment of the present invention.

Next, an example of operation of autonomous travel of the combine harvester 1 according to the present embodiment is described with reference to a flowchart illustrating in FIG. 6.

In the combine harvester 1, it is assumed that the autonomous travel mode is set as the traveling mode and the work width reference mode is set as the route mode. First, at the mobile terminal 50, the field selection unit 55 selects the field 60 to be worked from the field information that is set in advance and stored in the terminal storage unit 52, and the travel route creation unit 56 creates a plurality of travel routes 63 parallel to the outline side 60*a* of the field 60 (step S1).

On the mobile terminal 50, the display control unit 58 causes a work screen 70 to display the outline of the field 60 and a plurality of travel routes 63. If the start operation of autonomous travel is performed by the travel start button 72 on the work screen 70 (step S2: Yes), before starting autonomous travel, the route adjustment controller 57 determines whether or not the travel route 63 to be worked is the outermost route 64 (step S3). If it is determined that the travel route 63 to be worked is not the outermost route 64 (step S3: No), the combine harvester 1 starts autonomous travel along the travel route 63 (step S4). If an unworked travel route 63 remains (step S5: Yes), the combine harvester 1 shifts to the next travel route 63 for autonomous travel. If no unworked travel route 63 remains (step S5: No), the autonomous travel is finished.

On the other hand, if it is determined that the travel route 63 to be worked is the outermost route 64 (step S3: Yes), in a case where the route adjustment controller 57 further determines that the work width reference mode is set, the preset field information is selected, and the route adjustment control for the outermost route 64 is not yet performed, etc. the route adjustment controller 57 recommends route adjustment control to the operator (step S6).

In response to recommendation by operation of the route adjustment control, if the operator operates route adjustment control by means of the route adjustment button 77 or the like (step S7: Yes), the route adjustment controller 57 performs route adjustment control of the outermost route 64, and further adjusts travel routes 63 other than the outermost route 64 so as to be arranged at intervals of work width from the adjusted outermost route 64*b* (step S8). Then, the combine harvester 1 starts autonomous travel along the adjusted outermost route 64*b* (step S4), and if an unworked travel route 63*b* remains (step S5: Yes), the combine harvester 1 shifts to the next travel route 63*b* for autonomous travel, and if no unworked travel route 63*b* remains (step S5: No), the combine harvester 1 finishes autonomous travel.

As described above, according to the present embodiment, the combine harvester 1 is a work vehicle that creates in advance a plurality of travel routes 63 parallel to the preset outline of the field 60 and performs autonomous travel based on the travel route 63, and is equipped with the control device 40 and the mobile terminal 50. The control device 40 functions as the autonomous travel controller 45 to control autonomous travel on the basis of the travel route 63. The mobile terminal 50 is equipped with a terminal control device 51, and the terminal control device 51 functions as the route adjustment controller 57 that performs route adjustment control to adjust the outermost route 64 when autonomously traveling on the outermost route 64 that is along the outline of the field 60 from among the plurality of travel routes 63

In other words, in the present disclosure, an autonomous travel method for a work vehicle such as a combine harvester 1 that prepares in advance a plurality of travel routes 63 parallel to a predetermined outline of a field 60 and performs autonomous travel based on the travel routes 63, comprising: an autonomous travel control process for controlling autonomous travel based on the plurality of travel routes 63; and When the autonomous travel of the outermost route 64 that is along the outline of the field 60 from among the plurality of travel routes 63 is performed, the route adjustment control process performs route adjustment control to adjust said outermost route 64.

This allows the combine harvester 1 to adjust the outermost route 64 regardless of the pre-created travel route 63*a* when automatically traveling on the outermost route 64 of the field 60 and to perform appropriate autonomous travel based on the adjusted outermost route 64*b*. Therefore, even if the current outline of the field 60, along which the autonomous travel is to be performed, differs from the preset outline of the field 60, the autonomous travel can be performed on the appropriate outermost route 64*b* that suits the current outline of the field 60. For example, even if the current outline of the field 60 is narrower than the preset outline of the field 60, the outermost route 64*b* can be set so that the combine harvester 1 does not deviate outside the current outline of the field 60. In addition, even if the current outline of the field 60 is wider than the preset outline of the field 60, the outermost route 64*b* can be set so that a gap between the current outline and the preset outline of the field 60, which becomes an unreaped area 61, is not left.

For example, the route adjustment controller 57 adjusts as route adjustment control the outermost route 64 so as to be parallel to the outline of the field 60 and pass through the combine harvester 1's own position. This allows the outermost travel route 64 to be adjusted to any position desired by the operator, so that the outermost route 64*b* can be set so that the combine 1 does not deviate outside the outline of the field 60. Thus, the combine harvester 1 can perform autonomous travel appropriately regardless of the pre-created travel route 63*a*.

Furthermore, for example, when starting autonomous travel on the outermost route 64, if the route adjustment control operation is performed, the autonomous travel controller 45 performs route adjustment control and then shifts to autonomous travel, while if the route adjustment control operation is not performed, the autonomous travel controller 45 does not shift to autonomous travel. This allows the route adjustment control of the outermost route 64 to be performed in response to any operation by the operator, and if no operation is performed by the operator, the route adjustment control of the outermost route 64 is not performed, so that the combine harvester 1 can be more reliably prevented from deviating outside the outline of the field 60 and thus perform autonomous travel appropriately.

Specifically, the terminal control device 51 of the mobile terminal 50 functions as a route mode setting unit that sets, as the route mode of the travel route 63 for performing autonomous travel, one of the modes which include: a work width reference mode in which a plurality of travel routes 63 are created so as to be parallel to the outline of the field 60 and arranged at intervals of the work width of the combine harvester 1 from the outline of the field 60; and a vehicle's own position reference mode in which travel routes 63 are created so as to be parallel to the outline of the field 60 and pass through the combine harvester 1's own position. When the work width reference mode is set, the route adjustment controller 57 adjusts as route adjustment control the outermost route 64 so as to be parallel to the outline of the field 60 and pass through the combine harvester 1's own position, as well as sets a plurality of travel routes 63 at intervals of the work width of the combine harvester 1 from the adjusted outermost route 64. This allows the outermost route 64b to be adjusted to any position desired by the operator, even if the work width reference mode is set, and the outermost route 64b can be set so that the combine harvester 1 does not deviate outside the outline of the field 60. Since the other travel routes 63 are also adjusted to suit the adjusted outermost route 64b, autonomous travel can be appropriately performed without resetting the reference line or recreating the plurality of travel routes 63.

The terminal control device 51 of the mobile terminal 50 functions as the alarm notification unit 59 that determines whether or not the distance from the combine harvester 1 to each outline side 60a constituting the outline of the field 60 in the travel direction of the combine harvester 1 is equal to or less than a predetermined distance threshold and issues an alarm when the distance is equal to or less than the distance threshold. When autonomous travel is performed on the outermost route 64, the alarm notification unit 59 excludes the outline side 60a, which is parallel to and closest to the outermost route 64, from the target to be alarmed. This allows autonomous travel on the outermost route 64 to be continued without issuing an alarm, even when the outermost route 64 is adjusted making an angle with respect to the preset outline of the field 60.

When the route adjustment controller 57 adjusts the pre-created outermost route 64a by the route adjustment control, it updates the set outline of the field 60 based on the adjusted outermost route 64b. This allows the set outline of the field 60 to be updated to suit the field 60 in which the current autonomous travel is performed, and it is possible to use the updated outline effectively for subsequent autonomous travel.

In the embodiment described above, it is described as an example that the route adjustment controller 57 of the combine harvester 1 performs route adjustment control when the route adjustment control operation is performed for the recommendation operation of the route adjustment control, when the route adjustment button 77 for route adjustment control is operated on the work screen 70, or when the start operation of autonomous travel, such as the travel start button 72, is performed on the work screen 70. However, the present disclosure is not limited to this example.

For example, in another embodiment, the route adjustment controller 57 may determine orientation of the combine harvester 1 with respect to the outermost route 64 based on the combine harvester 1's own position, a travel direction, field information, and the travel route 63 before autonomous travel on the outermost route 64 is started, and perform route adjustment control according to the determination result.

The reaping part 3 of the combine harvester 1 has different lengths from the center of the machine body to both ends in the work width direction (machine width direction). Therefore, for example, as shown in FIG. 3, when the outermost route 64 is created in advance by the travel route creation unit 56 so that a shorter one end of the reaping part 3 is along the outline of the field 60, if the combine harvester 1 is placed on the outermost route 64 with orientation that the longer other end of the reaping part 3 is along the outline of the field 60, the longer other end of the reaping part 3 deviates outside the outline of the field 60. Alternatively, when the outermost route 64 is created in advance by the travel route creation unit 56 so that the longer other end of the reaping part 3 is along the outline of the field 60, if the combine harvester 1 is placed on the outermost route 64 with orientation that the shorter one end of the reaping part 3 is along the outline of the field 60, one end of the reaping part 3 does not reach the outline of the field 60 and thus the unreaped area 61 is left. In contrast, when the route adjustment controller 57 determines, for example, that the orientation of the combine harvester 1 with respect to the outermost route 64 is opposite to the orientation assumed when the outermost route 64 is created, the route adjustment controller 57 performs route adjustment control to adjust the outermost route 64 so as to suit the outline of the field 60 regardless of orientation of the combine harvester 1.

The route adjustment controller 57 may perform route adjustment control in response to operation of the route adjustment button 77 or operation of the route adjustment control for the recommendation operation of the route adjustment control, as well as according to the determination result of the orientation of the combine harvester 1 with respect to the outermost route 64.

As described above, according to the other embodiment, the route adjustment controller 57 performs route adjustment control when autonomous travel in a direction opposite to the travel direction set for the outermost route 64 is performed.

Specifically, for autonomous travel of the combine harvester 1 equipped with the reaping part 3, which is a work machine having different lengths from the center of the machine body to both ends, when the outermost route 64 is created in advance so that one end of the reaping part 3 is along the outline of the field 60, and when the combine harvester 1 performs autonomous travel on the outermost route 64 so that one end of the reaping part 3 is along the outline of the field 60 (i.e., the orientation of the combine harvester 1 is opposite to the orientation assumed when the outermost route 64 is created), the route adjustment controller 57 performs route adjustment control. When the outermost route 64 is created in advance by setting the travel direction so that one end of the reaping part 3 is along the outline of the field 60, and when autonomous travel in a direction opposite to the travel direction set for the outermost route 64 is performed, the route adjustment controller 57 may perform the route adjustment control.

This makes it possible to perform autonomous travel on the appropriate outermost route 64 that suits the outline of the field 60, even when autonomous travel in a direction opposite to the travel direction assumed in advance for the outermost route 64 is performed. For example, even if the combine 1 is placed on the outermost route 64 with orientation so that the longer other end of the reaping part 3 is along the outline of the field 60 when the outermost travel route 64 is created in advance so that the shorter one end of the reaping part 3 is along the outline of the field 60, it is possible to set the outermost route 64 such that the other end of the reaping part 3 does not deviate outside the outline of the field 60 by performing the route adjustment control. Even if the combine 1 is placed on the outermost route 64 with orientation so that the shorter end of the reaping part 3 is along the outline of the field 60 when the outermost travel route 64 is created in advance so that the longer other end of the reaping part 3 is along the outline of the field 60, it is possible to set the outermost route 64 such that the unreaped area 61 is not left in the gap between one end of the reaping part 3 and the outline of the field 60.

Alternatively, in another embodiment, before autonomous travel on the outermost route 64 is started, the route adjustment controller 57 may determine the positional relationship between the reaping part 3 of the combine harvester 1 and the outline of the field 60 based on the combine harvester 1's own position, the travel direction of the combine harvester 1, the field information, and the travel route 63, and the route adjustment control, and perform the route adjustment control according to the determination result. For example, when the route adjustment controller 57 calculates the position information of one end of the reaping part 3 and determines that the reaping part 3 is located outside the outline of the field 60, it determines that the reaping part 3 deviates outside the outline of the field 60 and performs route adjustment control.

The route adjustment controller 57 may perform route adjustment control in response to operation of the route adjustment button 77 or operation of the route adjustment control for the recommendation operation of the route adjustment control, as well as according to the determination result of the positional relationship between the reaping part 3 of the combine harvester 1 and the outline of the field 60.

As described above, according to the other embodiment, when one end of the reaping part 3 equipped with the combine harvester 1 is located outside the outline of the field 60 in the machine width direction, the route adjustment controller 57 performs route adjustment control.

This allows the outermost route 64 to be set preventing one end of the reaping part 3 from deviating outside the outline of the field 60.

In the above embodiment, it is described as an example that the route adjustment controller 57 adjusts as route adjustment control the outermost route 64 so as to be parallel to the outline side 60*a* of the field 60 and pass through the combine harvester 1's own position, but the present disclosure is not limited to this example. For example, in another embodiment, the route adjustment controller 57 may adjust as route adjustment control the outermost route 64 so as to get close to the outline side 60*a* of the field 60 or separate away from the outline side 60*a* of the field 60 by a predetermined shift width.

Alternatively, in another embodiment, the route adjustment controller 57 may switch as route adjustment control the route mode from the work width reference mode to another mode and recreate the travel route 63 for the outermost route 64 by the travel route creation unit 56. For example, the route adjustment controller 57 switches as route adjustment control the route mode from the work width reference mode to the vehicle's own position reference mode, and the travel route creation unit 56 recreates a single travel route 63 for the outermost route 64, which is parallel to the outline of the field 60 and passes through the combine harvester 1's own position.

Before switching the route mode from the work width reference mode to another mode, the route adjustment controller 57 may notify the operator of the switching of the route mode by means of a screen display by the display unit 54 or an audio output, or it may recommend operating the switching of the route mode to the operator.

As described above, according to another embodiment, the combine harvester 1 sets, as the route mode to set the travel route 63 for performing autonomous travel, one of the modes which include: a work width reference mode in which a plurality of travel routes 63 are set so as to be parallel to the outline of the field 60 and arranged at intervals of the work width of the combine harvester 1 from the outline of the field 60; and a vehicle's own position reference mode in which travel routes 63 are set so as to be parallel to the outline of the field 60 and pass through the combine harvester 1's own position. When the work width reference mode is set, the route adjustment controller 57 switches as route adjustment control the route mode from the work width reference mode to the vehicle's own position reference mode.

This allows route adjustment control to recreate and adjust the travel route 63 in the appropriate route mode for the outermost route 64, thereby performing appropriate autonomous travel based on the adjusted outermost route 64.

Figure 7:
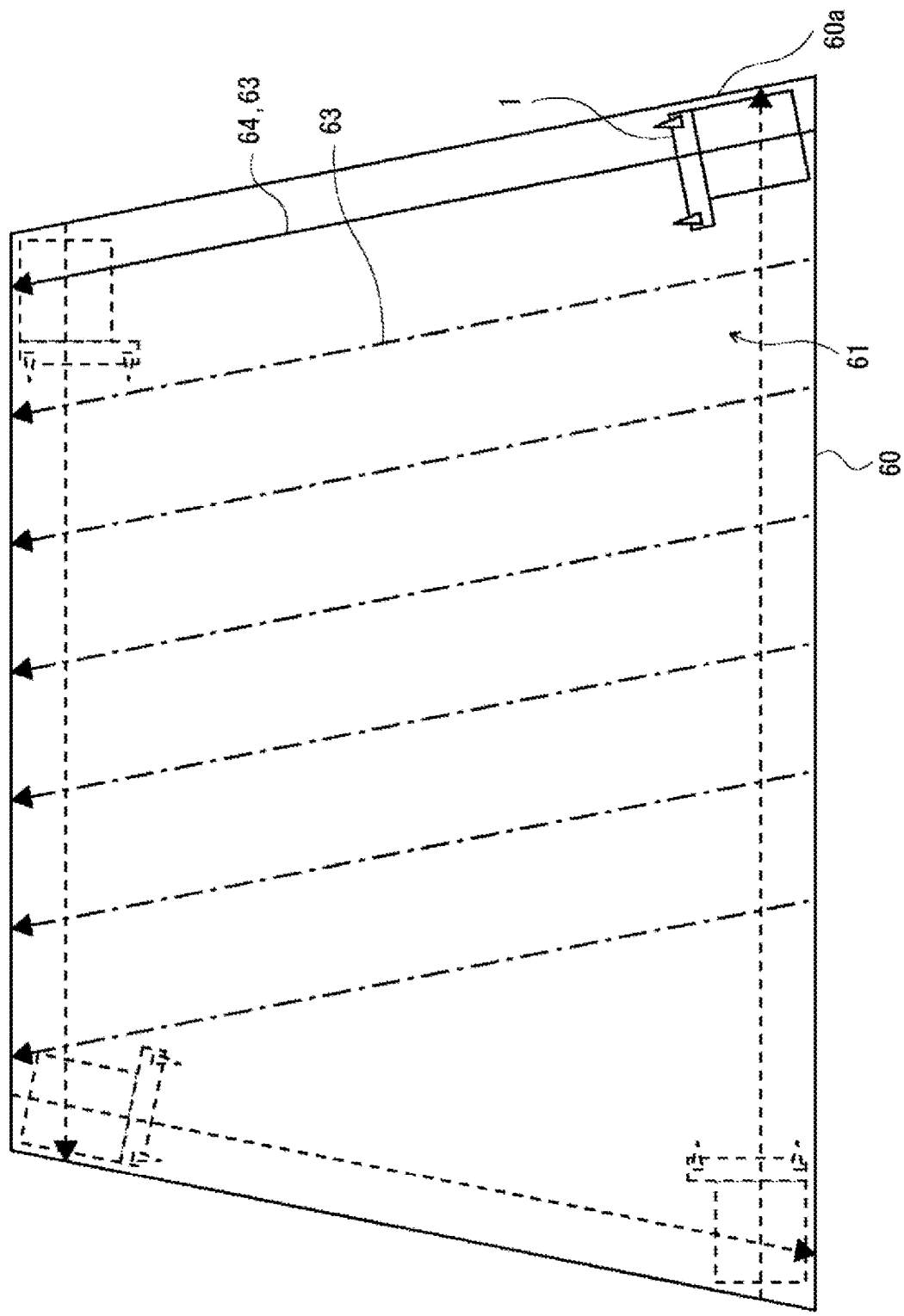
FIG. 7 is a plan view illustrating an example of the field in which a travel route is set at the third route mode in the combine harvester according to the embodiment of the present disclosure.

In the embodiment described above, it is described as an example that the combine harvester 1 sets either one of the work width reference mode or the vehicle's own position reference mode as a route mode, but the present disclosure is not limited to this example. For example, the combine harvester 1 can set a third route mode other than the work width reference mode and the vehicle's own position reference mode as a route mode, and the travel route creation unit 56 may, when the third route mode is set, create the travel route 63 of the outermost route 64 so as to be parallel to the outline of the field 60 and pass through the combine harvester 1's own position, as well as create a plurality of travel routes 63 parallel to the outline of the field 60 and at intervals of the work width of the combine harvester 1 from the created outermost route 64. In other words, in the third route mode, as shown by the solid or dashed lines in FIG. 7, the outermost route 64 is created in the vehicle's own position reference mode, and in the area inside the outermost route 64, as shown by the single-dotted line in FIG. 7, a plurality of travel routes 63 are created in the work width reference mode in which the outermost route 64 is set as the reference line.

In another embodiment described above, when the route adjustment controller 57 switches the route mode from the work width reference mode to another mode as route adjustment control, it may switch the route mode to the third route mode and recreate the travel route 63 for the outermost route 64 by the travel route creation unit 56.

In the embodiment mentioned above, it is described as an example that when the work width reference mode is set as the route mode, as shown in FIG. 5, the display control unit 58 displays a plurality of travel routes 63 in the map column 71, but the present disclosure is not limited to this example.

As another example, the display control unit 58 may hide only the outermost route 64 of the plurality of travel routes 63. For example, a headland can be formed along the outline side 60*a* which is the reference line of the travel route 83 by performing autonomous travel (autonomous straight travel) of the combine harvester 1 based on the outermost route 64, but the operator may form the headland manually by performing manual travel of the combine harvester 1 along the outline side 60*a*. Thus, the display control unit 58 may hide only the outermost route 64 in response to any operation by the operator, or when the manual travel mode is set, the display control unit 58 may hide only the outermost route 64 or the plurality of travel routes 63 including the outermost route 64. After a manual travel along the outline side 60*a* is performed, the travel route creation unit 56 may create a plurality of travel routes 63 by using the route of the manual travel as a reference line.

In the embodiment mentioned above, it is described as an example that a combine harvester 1 is configured as a normal combine harvester, but the present disclosure is not limited to this example. The combine harvester 1 may also be configured as a head-feeding type combine harvester, and the present disclosure is preferable for a combine harvester 1 equipped with the reaping part 3 having deferent the lengths from the center of the machine body to both ends. In the above embodiments, an example in which the work vehicle is composed of the combine harvester 1 is described, but the present disclosure is not limited to this example. For example, the work vehicle of the present disclosure may be composed of other agricultural machinery, or other work vehicles other than agricultural machinery, and the present disclosure is preferable for the work vehicle equipped with work machine having different lengths from the center of the machine body to both ends.

Note that the present disclosure can be appropriately changed unless contrary to gist or spirit of the present disclosure that can be read out from the claims and the whole specification, and an autonomous travel method, a working vehicle, and an autonomous travel system accompanied by such a change are also included in the spirit of the present disclosure.

APPENDICES

Appended below is a summary of the present disclosure extracted from the embodiments described above. It should be noted that respective components and processing functions described in the appendices below can be selected and combined as appropriate.

Appendix 1

An autonomous travel method for a work vehicle that pre-creates a plurality of travel routes parallel to a preset outline of a field and performs autonomous travel based on the travel routes, the method comprising the steps of: performing autonomous travel control to control the autonomous travel based on the travel routes; and performing route adjustment control to adjust an outermost route when the autonomous travel is performed on the outermost route along the outline of the field among the plurality of travel routes.

Appendix 2

The autonomous travel method according to appendix 1, wherein the step of performing route adjustment control includes, as the route adjustment control, adjusting the outermost route so that the outermost route is parallel to the outline of the field and passes through the work vehicle's own position.

Appendix 3

The autonomous travel method according to appendix 1 or 2, wherein when the autonomous travel is started on the outermost route, the step of performing autonomous travel control includes, if operation of the route adjustment control is performed, enabling shift to the autonomous travel after the route adjustment control is performed, and if operation of the route adjustment control is not performed, disabling shift to the autonomous travel.

Appendix 4

The autonomous travel method according to appendix 1 or 2, wherein the step of performing route adjustment control is performed when the autonomous travel is performed in a direction opposite to a travel direction set for the outermost route.

Appendix 5

The autonomous travel method according to appendix 4, wherein the step of performing route adjustment control is performed, when the outermost route is pre-created so that one end of the work machine is along the outline of the field and when the work machine performs autonomous travel on the outermost route so that the other end of the work machine is along the outline of the field, in order to perform autonomous travel of the work vehicle equipped with a work machine having different lengths from a center of a machine body to both ends in a machine width direction.

Appendix 6

The autonomous travel method according to appendix 1 or 2, wherein the step of performing route adjustment control is performed when one end of a work machine mounted on the work vehicle is positioned outside the outline of the field in a machine width direction.

Appendix 7

The autonomous travel method according to any one of appendices 1 to 3 further comprising the step of setting a route mode for setting, as a route mode of the travel route on which the autonomous travel is performed, either a work width reference mode in which the plurality of travel routes are set so that the plurality of travel routes are parallel to the outline of the field and arranged at intervals of a work width of the work vehicle from the outline of the field, or a vehicle's own position reference mode in which the travel routes are set so that the travel routes are parallel to the outline of the field and pass through the work vehicle's own position, wherein the step of performing route adjustment control includes, as the route adjustment control, when the work width reference mode is set, adjusting the outermost route so that the outermost route is parallel to the outline of the field and passes through the work vehicle's own position, and creating the plurality of travel routes at intervals of the work width of the work vehicle from the adjusted outermost route.

Appendix 8

The autonomous travel method according to any one of appendices 1 to 3 further comprising the step of setting a route mode for setting, as a route mode for setting the travel route on which the autonomous travel is performed, either a work width reference mode in which the plurality of travel routes are set so that the plurality of travel routes are parallel to the outline of the field and arranged at intervals of a work width of the work vehicle from the outline of the field, or a vehicle's own position reference mode in which the travel routes are set so that the travel routes are parallel to the outline of the field and pass through the work vehicle's own position, wherein the step of performing route adjustment control includes, as the route adjustment control, when the work width reference mode is set, switching the route mode from the work width reference mode to the vehicle's own position reference mode.

Appendix 9

The autonomous travel method according to any one of appendices 1 to 8 further comprising the step of determining whether or not a distance from the work vehicle to each of outline sides forming the outline of the field in an advancing direction of the work vehicle is equal to or less than a predetermined distance threshold, and issuing an alarm when the distance is equal to or less than the distance threshold, wherein the step of issuing an alarm includes excluding an outline side that is parallel to the outermost route and nearest to the outermost route from a target to be alarmed when the autonomous travel is performed on the outermost route.

Appendix 10

The autonomous travel method according to any one of appendices 1 to 9, wherein the step of performing route adjustment control includes updating the preset outline of the field based on the adjusted outermost route when the pre-created outermost route is adjusted by the route adjustment control.

Appendix 11

A work vehicle for pre-creating a plurality of travel routes parallel to a preset outline of a field and performing autonomous travel based on the travel routes, comprising: an autonomous travel controller to control the autonomous travel based on the travel routes; and a route adjustment controller to perform route adjustment control for adjusting an outermost route when the autonomous travel is performed on the outermost route along the outline of the field among the plurality of travel routes.

Appendix 12

The work vehicle according to appendix 11, wherein the route adjustment controller adjusts, as the route adjustment control, the outermost route so that the outermost route is parallel to the outline of the field and passes through the work vehicle's own position.

Appendix 13

The work vehicle according to appendix 11 or 12, wherein when the autonomous travel is started on the outermost route, the autonomous travel controller, if operation of the route adjustment control is performed, enables shift to the autonomous travel after the route adjustment control is performed, and if operation of the route adjustment control is not performed, disables shift to the autonomous travel.

Appendix 14

The work vehicle according to appendix 11 or 12, wherein the route adjustment controller performs the route adjustment control when the autonomous travel is performed in a direction opposite to a travel direction set for the outermost route.

Appendix 15

The work vehicle according to appendix 14, wherein the route adjustment controller performs the route adjustment control, when the outermost route is pre-created so that one end of the work machine is along the outline of the field and when the work machine performs autonomous travel on the outermost route so that the other end of the work machine is along the outline of the field, in order to perform autonomous travel of the work vehicle equipped with a work machine having different lengths from a center of a machine body to both ends in a machine width direction.

Appendix 16

The work vehicle according to appendix 11 or 12, wherein the route adjustment controller performs the route adjustment control when one end of a work machine mounted on the work vehicle is positioned outside the outline of the field in a machine width direction.

Appendix 17

The work vehicle according to any one of appendices 11 to 13 further comprising a route mode setting unit sets, as a route mode of the travel route on which the autonomous travel is performed, either a work width reference mode in which the plurality of travel routes are set so that the plurality of travel routes are parallel to the outline of the field and arranged at intervals of a work width of the work vehicle from the outline of the field, or a vehicle's own position reference mode in which the travel routes are set so that the travel routes are parallel to the outline of the field and pass through the work vehicle's own position, wherein the route adjustment controller adjusts, as the route adjustment control, when the work width reference mode is set, the outermost route so that the outermost route is parallel to the outline of the field and passes through the work vehicle's own position, and creates the plurality of travel routes at intervals of the work width of the work vehicle from the adjusted outermost route.

Appendix 18

The work vehicle according to any one of appendices 11 to 13 further comprising a route mode setting unit sets, as a route mode for setting the travel route on which the autonomous travel is performed, either a work width reference mode in which the plurality of travel routes are set so that the plurality of travel routes are parallel to the outline of the field and arranged at intervals of a work width of the work vehicle from the outline of the field, or a vehicle's own position reference mode in which the travel routes are set so that the travel routes are parallel to the outline of the field and pass through the work vehicle's own position, wherein the route adjustment controller switches, as the route adjustment control, when the work width reference mode is set, the route mode from the work width reference mode to the vehicle's own position reference mode.

Appendix 19

The work vehicle according to any one of appendices 11 to 18 further comprising an alarm notification unit to determine whether or not a distance from the work vehicle to each of outline sides forming the outline of the field in an advancing direction of the work vehicle is equal to or less than a predetermined distance threshold, and issue an alarm when the distance is equal to or less than the distance threshold, wherein the alarm notification unit excludes an outline side that is parallel to the outermost route and nearest to the outermost route from a target to be alarmed when the autonomous travel is performed on the outermost route.

Appendix 20

The work vehicle according to any one of appendices 11 to 19, wherein the route adjustment controller updates the preset outline of the field based on the adjusted outermost route when the pre-created outermost route is adjusted by the route adjustment control.

Appendix 21

An autonomous travel system of a work vehicle for pre-creating a plurality of travel routes parallel to a preset outline of a field and performing autonomous travel based on the travel routes, comprising: an autonomous travel controller to control the autonomous travel based on the travel routes; and a route adjustment controller to perform route adjustment control for adjusting an outermost route when the autonomous travel is performed on the outermost route along the outline of the field among the plurality of travel routes.

Appendix 22

The autonomous travel system according to appendix 21, wherein the route adjustment controller adjusts, as the route adjustment control, the outermost route so that the outermost route is parallel to the outline of the field and passes through the work vehicle's own position.

Appendix 23

The autonomous travel system according to appendix 21 or 22, wherein when the autonomous travel is started on the outermost route, the autonomous travel controller enables, if operation of the route adjustment control is performed, shift to the autonomous travel after the route adjustment control is performed, and the autonomous travel controller disables, if operation of the route adjustment control is not performed, shift to the autonomous travel.

Appendix 24

The autonomous travel system according to appendix 21 or 22, wherein the route adjustment controller performs the route adjustment control when the autonomous travel is performed in a direction opposite to a travel direction set for the outermost route.

Appendix 25

The autonomous travel system according to appendix 24, wherein the route adjustment controller performs the route adjustment control when the outermost route is pre-created so that one end of the work machine is along the outline of the field and when the work machine performs autonomous travel on the outermost route so that the other end of the work machine is along the outline of the field, in order to perform autonomous travel of the work vehicle equipped with a work machine having different lengths from a center of a machine body to both ends in a machine width direction.

Appendix 26

The autonomous travel system according to appendix 21 or 22, wherein the route adjustment controller performs the route adjustment control when one end of a work machine mounted on the work vehicle is positioned outside the outline of the field in a machine width direction.

Appendix 27

The autonomous travel system according to any one of appendices 21 to 23 further comprising a route mode setting unit sets, as a route mode of the travel route on which the autonomous travel is performed, either a work width reference mode in which the plurality of travel routes are set so that the plurality of travel routes are parallel to the outline of the field and arranged at intervals of a work width of the work vehicle from the outline of the field, or a vehicle's own position reference mode in which the travel routes are set so that the travel routes are parallel to the outline of the field and pass through the work vehicle's own position, wherein the route adjustment controller adjusts, as the route adjustment control, when the work width reference mode is set, the outermost route so that the outermost route is parallel to the outline of the field and passes through the work vehicle's own position, and creates the plurality of travel routes at intervals of the work width of the work vehicle from the adjusted outermost route.

Appendix 28

The autonomous travel system according to any one of appendices 21 to 23 further comprising a route mode setting unit sets, as a route mode for setting the travel route on which the autonomous travel is performed, either a work width reference mode in which the plurality of travel routes are set so that the plurality of travel routes are parallel to the outline of the field and arranged at intervals of a work width of the work vehicle from the outline of the field, or a vehicle's own position reference mode in which the travel routes are set so that the travel routes are parallel to the outline of the field and pass through the work vehicle's own position, wherein the route adjustment controller switches, as the route adjustment control, when the work width reference mode is set, the route mode from the work width reference mode to the vehicle's own position reference mode.

Appendix 29

The autonomous travel system according to any one of appendices 21 to 28 further comprising an alarm notification unit to determine whether or not a distance from the work vehicle to each of outline sides forming the outline of the field in an advancing direction of the work vehicle is equal to or less than a predetermined distance threshold, and issue an alarm when the distance is equal to or less than the distance threshold, wherein the alarm notification unit excludes an outline side that is parallel to the outermost route and nearest to the outermost route from a target to be alarmed when the autonomous travel is performed on the outermost route.

Appendix 30

The autonomous travel system according to any one of appendices 21 to 29, wherein the route adjustment controller updates the preset outline of the field based on the adjusted outermost route when the pre-created outermost route is adjusted by the route adjustment control.

REFERENCE SIGNS LIST

1 Combine harvester (work vehicle)
3 Reaping part
40 Control device
45 Autonomous travel controller
50 Mobile terminal
51 Terminal control device
56 Travel route creation unit
57 Route adjustment controller
59 Alarm notification unit
60 Field
63 Travel route

The invention claimed is:

1. An autonomous travel method for a work vehicle that pre-creates a plurality of travel routes parallel to a preset outline of a field and performs autonomous travel based on the travel routes, the method comprising the steps of:
performing autonomous travel control to control the autonomous travel based on the travel routes; and
performing route adjustment control to adjust an outermost route that is along the outline of the field from among the plurality of travel routes, when the autonomous travel is performed on the outermost route,
wherein when the autonomous travel is started on the outermost route, the autonomous travel control includes, if an operation for the route adjustment control is performed, enabling shift to the autonomous travel after the route adjustment control is performed, and if the operation for the route adjustment control is not performed, disabling shift to the autonomous travel.

2. The autonomous travel method according to claim 1, wherein the route adjustment control includes, as the route adjustment control, adjusting the outermost route so that the outermost route is parallel to the outline of the field and passes through the work vehicle's own position.

3. The autonomous travel method according to claim 1, wherein the route adjustment control is performed when the autonomous travel is performed in a direction opposite to a travel direction set for the outermost route.

4. The autonomous travel method according to claim 1, wherein the route adjustment control is performed when the outermost route is pre-created so that one end of a work machine having different lengths from a center of a machine body to both ends in a machine width direction is along the outline of the field and when the work machine performs the autonomous travel on the outermost route so that the other end of the work machine is along the outline of the field in order to perform the autonomous travel of the work vehicle equipped with the work machine.

5. The autonomous travel method according to claim 1, wherein the route adjustment control is performed when one end of a work machine mounted on the work vehicle is positioned outside the outline of the field in a machine width direction.

6. The autonomous travel method according to claim 1 further comprising route mode setting for setting, as a route mode of the travel route on which the autonomous travel is performed, either a work width reference mode in which the plurality of travel routes are set so that the plurality of travel routes are parallel to the outline of the field and arranged at intervals of a work width of the work vehicle from the outline of the field, or a vehicle's own position reference mode in which the travel routes are set so that the travel routes are parallel to the outline of the field and pass through the work vehicle's own position,
wherein the route adjustment control includes, as the route adjustment control, adjusting the outermost route so that the outermost route is parallel to the outline of the field and passes through the work vehicle's own position, and creating the plurality of travel routes at intervals of the work width of the work vehicle from the adjusted outermost route, when the work width reference mode is set.

7. The autonomous travel method according to claim 1 further comprising route mode setting for setting, as a route mode for setting the travel route on which the autonomous travel is performed, either a work width reference mode in which the plurality of travel routes are set so that the plurality of travel routes are parallel to the outline of the field and arranged at intervals of a work width of the work vehicle from the outline of the field, or a vehicle's own position reference mode in which the travel routes are set so that the travel routes are parallel to the outline of the field and pass through the work vehicle's own position,
wherein the route adjustment control includes, as the route adjustment control, switching the route mode from the work width reference mode to the vehicle's own position reference mode, when the work width reference mode is set.

8. The autonomous travel method according to claim 1 further comprising alarm issuing of determining whether or not a distance from the work vehicle to each of outline sides forming the outline of the field in an advancing direction of the work vehicle is equal to less than a predetermined distance threshold, and issuing an alarm when the distance is equal to or less than the distance threshold,
wherein the alarm issuing includes excluding an outline side that is parallel to the outermost route and nearest to the outermost route from a target to be alarmed when the autonomous travel is performed on the outermost route.

9. The autonomous travel method according to claim 1, wherein the route adjustment control includes updating the preset outline of the field based on the adjusted outermost route when the pre-created outermost route is adjusted by the route adjustment control.

10. A work vehicle for pre-creating a plurality of travel routes parallel to a preset outline of a field and performing autonomous travel based on the travel routes, comprising:
an autonomous travel controller to control the autonomous travel based on the travel routes; and
a route adjustment controller to perform route adjustment control for adjusting an outermost route that is along the outline of the field from among the plurality of travel routes, when the autonomous travel is performed on the outermost route, wherein when the autonomous travel is started on the outermost route, the autonomous travel controller includes, if an operation for the route adjustment controller is performed, enabling shift to the autonomous travel after the route adjustment controller is performed, and if the operation for the route adjustment controller is not performed, disabling shift to the autonomous travel.

11. An autonomous travel system of a work vehicle for pre-creating a plurality of travel routes parallel to a preset outline of a field and performing autonomous travel based on the travel routes, comprising:

an autonomous travel controller to control the autonomous travel based on the travel routes; and a route adjustment controller to perform route adjustment control for adjusting an outermost route that is along the outline of the field from among the plurality of travel routes, when the autonomous travel is performed on the outermost route, wherein when the autonomous travel is started on the outermost route, the autonomous travel controller includes, if an operation for the route adjustment controller is performed, enabling shift to the autonomous travel after the route adjustment controller is performed, and if the operation for the route adjustment controller is not performed, disabling shift to the autonomous travel.

* * * * *